(12) United States Patent
Binzel et al.

(10) Patent No.: US 11,986,861 B2
(45) Date of Patent: May 21, 2024

(54) MACHINE SIDE CONNECTION FOR FUME EXTRACTION TORCHES

(71) Applicant: The ESAB Group Inc., Florence, SC (US)

(72) Inventors: Oliver Binzel, Wettingen (CH); Marc A. Hartel, Reiskirchen (DE)

(73) Assignee: The ESAB Group Inc., Florence, SC (US)

(*) Notice: Subject to any disclaimer, the term of this patent is extended or adjusted under 35 U.S.C. 154(b) by 465 days.

(21) Appl. No.: 17/140,019

(22) Filed: Jan. 1, 2021

(65) Prior Publication Data

US 2021/0205865 A1 Jul. 8, 2021

Related U.S. Application Data

(60) Provisional application No. 62/957,309, filed on Jan. 5, 2020.

(51) Int. Cl.
| | | |
|---|---|---|
| *B08B 15/04* | (2006.01) | |
| *B23K 9/29* | (2006.01) | |
| *B23K 9/32* | (2006.01) | |

(52) U.S. Cl.
CPC .............. *B08B 15/04* (2013.01); *B23K 9/295* (2013.01); *B23K 9/325* (2013.01)

(58) Field of Classification Search
CPC ........ B23K 9/295; B23K 9/325; B23K 9/291; B23K 9/296; B08B 15/04
See application file for complete search history.

(56) References Cited

U.S. PATENT DOCUMENTS 3,775,587 A * 11/1973 Lindkvist ................ B08B 15/04
                                                                    219/136
3,886,344 A    5/1975 Frantzreb, Sr. et al.
(Continued)

FOREIGN PATENT DOCUMENTS

CN      206653063 U    11/2017
DE    102013107952 A1    2/2015
(Continued)

OTHER PUBLICATIONS

Notification of Transmittal of International Search Report and Written Opinion including International Search Report and Written Opinion for International Application No. PCT/US2021/012049 dated May 10, 2021, 13 pages.

*Primary Examiner* — Brian W Jennison
(74) *Attorney, Agent, or Firm* — Edell, Shapiro & Finnan, LLC (57) ABSTRACT

Provided for herein is an apparatus that includes a machine-side connection housing. The machine-side connection housing includes a machine-side connection configured to provide a welding consumable or an electrical connection to a welding/cutting torch head. The apparatus also includes a fume extraction connection housing that includes a fume extraction connection to a fume extraction device. A flexible connection is arranged between the machine-side connection housing and the fume extraction connection housing. A seal that includes a first orifice is arranged between the fume extraction connection and the machine-side connection. Finally, a conduit, configured to connect the machine-side connection to the welding/cutting torch head, is arranged to pass through the first orifice, through the flexible connection and through the fume extraction connection housing to the welding/cutting torch head.

12 Claims, 9 Drawing Sheets

(56) References Cited

U.S. PATENT DOCUMENTS

| | | | |
|---|---|---|---|
| 3,898,414 A | | 8/1975 | Hawley |
| 4,340,804 A | | 7/1982 | Krieg |
| 4,496,823 A | * | 1/1985 | Mann ................... F16L 11/22 |
| | | | 219/137.41 |
| 4,926,024 A | * | 5/1990 | Mann ................... B23K 9/32 |
| | | | 219/137.9 |
| 5,007,664 A | | 4/1991 | Mann |
| 7,544,914 B2 | | 6/2009 | Zamuner |
| 7,800,017 B2 | | 9/2010 | Zamuner |
| 8,283,600 B2 | | 10/2012 | Zamuner |
| 9,630,037 B2 | | 4/2017 | Berghuijs et al. |
| 9,802,266 B2 | | 10/2017 | Moons et al. |
| 9,846,439 B2 | | 12/2017 | Carman et al. |
| 10,232,458 B2 | * | 3/2019 | Grossauer ............... B23K 9/173 |
| 2010/0096374 A1 | | 4/2010 | Karpoff et al. |
| 2010/0096810 A1 | * | 4/2010 | Baughman ......... B23K 15/0046 |
| | | | 277/589 |
| 2013/0075379 A1 | | 3/2013 | Yin et al. |
| 2016/0236304 A1 | * | 8/2016 | Grossauer ............... B23K 9/323 |
| 2018/0229326 A1 | | 8/2018 | Gagnon |

FOREIGN PATENT DOCUMENTS

| | | |
|---|---|---|
| GB | 1470218 A | 4/1977 |
| GB | 2214598 A | 9/1989 |

\* cited by examiner

MACHINE SIDE CONNECTION FOR FUME EXTRACTION TORCHES

CROSS-REFERENCE TO RELATED APPLICATIONS

This application claims the benefit of U.S. Provisional Patent Application No. 62/957,309 filed on Jan. 5, 2020. The contents of this provisional application are hereby incorporated by reference herein.

TECHNICAL FIELD

The present disclosure relates to welding torches and cutting torches, and fume extraction systems thereof in particular.

BACKGROUND

Figure 1:
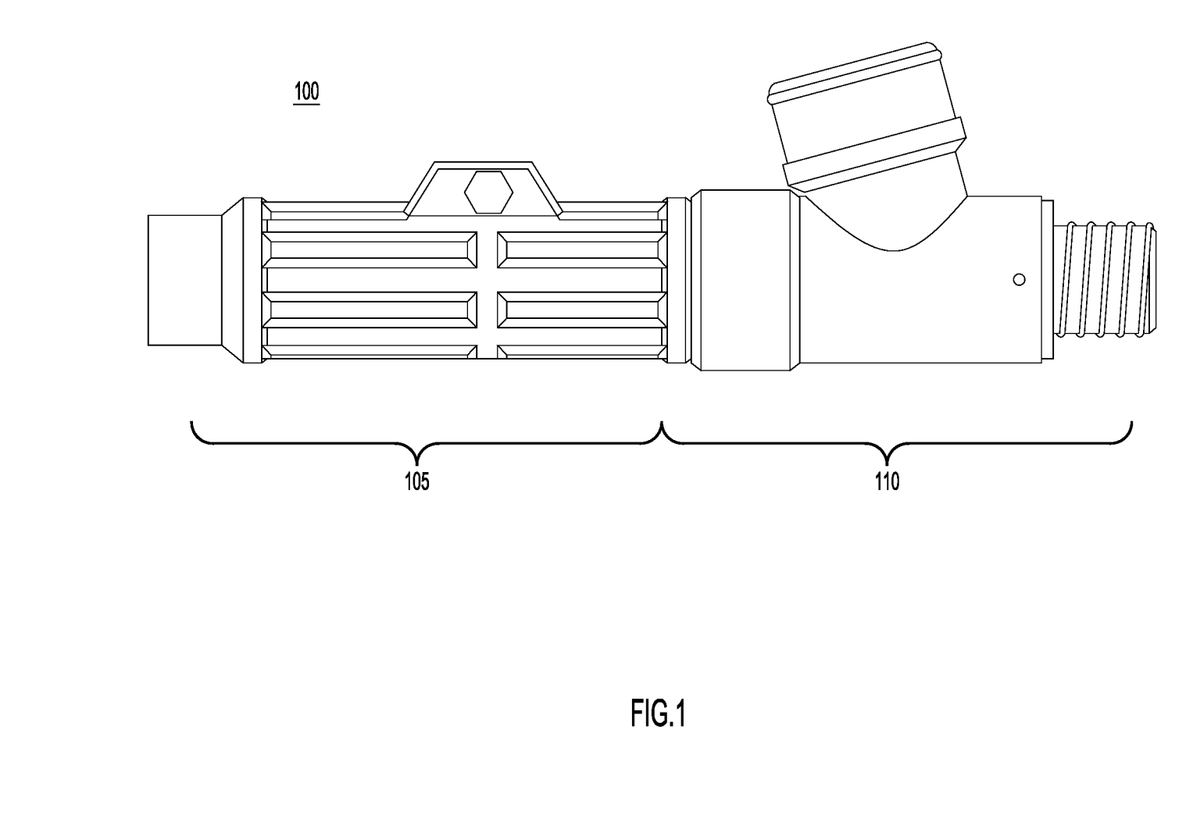
FIG. 1 is a related art fume extraction machine-side connection.

Fume extraction torch heads provide an efficient way for hazardous weld or cutting fumes to be extracted from the weld or cutting location through the torch head. Fume extraction torches are equipped with passageways at the tip of the torch head that extract the fumes through the torch head, which then travel through the torch cable or hose attached to the torch head, and eventually travel out to a fume extraction hood. In typical fume extraction setups, such as the one illustrated in FIG. 1, the machine-side connection 100 that couples the torch cable or hose to the wire feeder, welder, or cutting machine includes a cable support housing 105 and a fume extraction T-joint 110 to which a fume extraction hose connects. The T-joint 110 rigidly screws onto the cable support housing 105 so that the combination thereof forms one solid structure that protrudes from the wire feeder, welder, or cutting machine. This single solid structure does not contain any flexibility, making the structure prone to breaking. In addition, the T-joint 110 has a fixed and predetermined orientation, preventing the positioning or alignment of the fume extraction hose. Furthermore, because the fume extraction hose that connects to the T-joint 110 is directly coupled to the cable support housing 105, the cable support housing 105 is prone to becoming dirty or contaminated, which can compromise the electrical connections in the connector housing.

DESCRIPTION OF EXAMPLE EMBODIMENTS

Overview

Provided for in example embodiments of the concepts and techniques of the present disclosure are fume extraction connections for connection of a torch cable or hose and a fume extraction hose to a welding/cutting machine-side, such as a wire feeder or power connection. As shown in the example embodiments discussed below, the connection for the fume extraction hose is separated from the machine-side connection housing (which couples to, for example, the wire feeder or welding/cutting power source) by a flexible and/or rotatable connection, such as a flexible or rotatable hose. This flexible and/or rotatable connection enables the fume extraction connection housing, and thus the fume extraction hose, to be rotated and/or pivoted with respect to the machine-side connection housing, which provides flexibility in placement of the machine-side connection housing with respect to that of the fume extraction hose. Furthermore, with the fume extraction connection housing being separated from the machine-side connection housing via the flexible and/or rotatable hose, the inflexible portion of the machine-side connection (e.g., the machine-side connection housing) does not protrude as far out from the wire feeder or welding/cutting power source as related art connectors, which minimizes the chance that the machine-side connection housing becomes broken. Moreover, by being able to rotate and/or position the fume extraction connection housing relative to the machine-side connection housing, as well as by spacing the fume extraction connection housing from the machine-side connection housing, some or all of the welding or cutting fumes extracted by the torch head may be prevented from reaching the machine-side connection housing, lessening or eliminating the possibility of contamination of the electrical connections that may be contained in the machine-side connection housing.

As also discussed below, the end of the fume extraction connection housing that is connected to the flexible and/or rotatable connection may be equipped with a seal that may prevent the vacuum applied to the fume extraction connection from also being applied to the flexible/rotatable hose and/or the machine-side connection housing. According to other example embodiments, the seal may be provided in the machine-side connection housing and may prevent the vacuum applied to the fume extraction connection from also being applied to machine-side connection. The seal may also minimize or otherwise lessen the amount of fresh air drawn into the extraction circuit, thereby increasing the extraction capacity of the torch head. The fume extraction connection may also be equipped with adapters that enable the fume extraction connection housing to accommodate different sized torch cables or hoses and fume extraction hoses.

Accordingly, provided for in example embodiments is an apparatus that includes a machine-side connection housing. The machine-side connection housing includes a machine-side connection configured to provide a welding consumable or an electrical connection to a torch head, such as a welding or cutting torch head. The apparatus also includes a fume extraction connection housing that includes a fume extraction connection to a fume extraction device. A flexible connection is arranged between the machine-side connection housing and the fume extraction connection housing. A seal that includes a first orifice is arranged between the fume extraction connection and the machine-side connection. Finally, a conduit, configured to connect the machine-side connection to the torch head, is arranged to pass through the first orifice, through the flexible connection and through the fume extraction connection housing to the torch head.

Also provided for is an apparatus that includes a fume extraction connection to a fume extraction device, an interior, a flexible connection to a machine-side connection housing, a torch head connection to a torch head, and a seal configured to seal the fume extraction connection from the machine-side connection housing.

The techniques of the present disclosure also provide for methods. The methods include providing a machine-side connection housing in which the machine-side connection housing includes a machine-side connection configured to provide a welding consumable or an electrical connection to a torch head. According to the methods, a fume extraction connection housing is also provided. The fume extraction connection housing includes a fume extraction connection to a fume extraction device. A flexible connection is arranged between the machine-side connection housing and the fume extraction connection housing, and a seal, that includes an orifice, is arranged between the fume extraction connection and the machine-side connection. Finally, a conduit is arranged to pass through the orifice, through the flexible connection and through the fume extraction connection housing to the torch head, such that the conduit is configured to connect the machine-side connection to the torch head.

Example Embodiments

According to the techniques of the present disclosure, provided for herein is a machine-side connection for fume extraction-type welding or cutting torches in which the connection piece for the fume extraction hose leading to the fume extraction unit is flexibly connected to the machine-side connection housing. A connection provided according to the techniques of the present disclosure may provide for easier routing of the fume extraction hose and may also shorten the length of the machine-side connection housing, creating a smaller obstacle in front of a wire feeder and/or welding/cutting power source. Also according to the techniques of the present disclosure, a seal may be used to, for example, minimize the amount of fresh air drawn into the extraction circuit, thereby increasing the extraction capacity of the torch. The seal may also prevent or lessen extraction gases contaminating and/or soiling of the machine-side connection housing and/or the machine-side connection contained therein.

Figure 2:
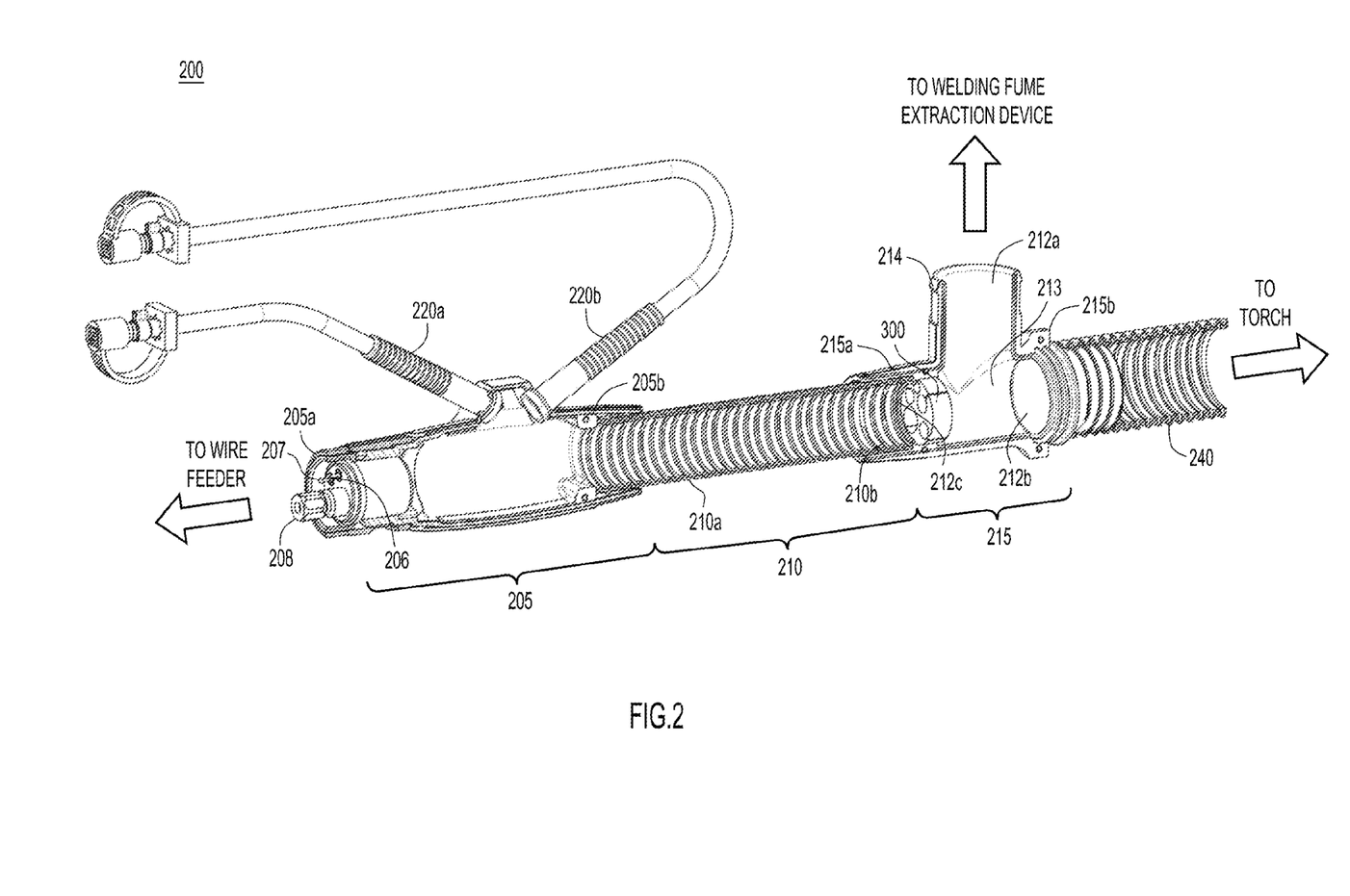
FIG. 2 is a cutaway view of a fume extraction connection housing, a flexible connection, and a machine-side connection housing, according to example embodiments.

One specific example embodiment of a device 200 according to the techniques of the present disclosure is illustrated in FIG. 2. Included in FIG. 2 are a cutaway view of a cable support housing 205 (serving as a machine-side connection housing), a cutaway view of a flexible portion (also referred to as a flexible connection) 210, a cutaway view of a fume extraction connection housing 215 and a cutaway view of a torch connection hose 240. As illustrated in FIG. 2, fume extraction connection housing 215 is configured as a T-joint, though other example embodiments may be configured in different ways. For example, fume extraction connection housing 215 may be embodied as a branched joint, such as a Y-joint, without deviating from the techniques of the present disclosure. According to still other example embodiments, fume extraction connection housing 215 may be embodied as a connection with more than three connections. For example, fume extraction connection housing 215 may include four or more branches to accommodate, for example, electrical power connections, electrical control connections, a wire feeder connection, a shield gas connection, a cooling gas connection, or other types of connections known to the skilled artisan.

A proximal end 205a of cable support housing 205 is configured to connect to a wire feeder and/or welding/cutting power source (not illustrated). As used herein, the terms "proximal" and "distal" refer to proximity or distance relative to a wire feeder or welding/cutting power source to which cable support housing 205 connects. Accordingly, proximal end 205a of cable support housing 205 is the end of cable support housing 205 that connects to the wire feeder or welding/cutting power source. The wire feeder and/or welding/cutting power source may provide welding wire, filler wire, shielding gas, process gas, power cables, control cables, welding consumables, and other connections known to the skilled artisan, to the torch head (not illustrated). Accordingly, proximal end 205a of cable support housing 205 includes filler or weld wire conduit connection 206, electrical or control connection 207, and power connection 208. Also contained in cable support housing 205 are cooling hose connections 220a and 220b, which provide cooling gas connections for the torch head. The skilled artisan understands that such cooling gas connections may be implemented through proximal end 205a of cable support housing 205 or omitted from cable support housing 205 without deviating from the techniques of the present disclosure. According to other example embodiments, cooling hose connections 220a and 220b may provide for a cooling liquid, such as water.

Distal end 205b of cable support housing 205 is configured to connect to proximal end 210a of flexible portion 210. Flexible portion 210 forms a flexible connection between cable support housing 205 and fume extraction connection housing 215. The connection between proximal end 210a of flexible portion 210 and distal end 205b of cable support housing 205 may be configured to provide relative rotation between flexible portion 210 and cable support housing 205. Accordingly, distal end 205b of cable support housing 205 may be embodied as a swivel or rotary joint. When embodied as a swivel or rotary joint, distal end 205b of cable support housing 205 may allow flexible portion 210 to rotate up to 360° relative to cable support housing 205. While the embodiment of FIG. 2 indicates that the rotary or swivel joint is incorporated into distal end 205b of cable support housing 205, other embodiments may incorporate the swivel or rotary joint into proximal end 210a of flexible portion 210.

Flexible portion 210 provides a conduit through which the connections provided by the wire feeder and/or welding/cutting power source reach fume extraction connection housing 215. Similarly, flexible portion 210 provides a conduit through which the cooling gases or liquids are connected between cable support housing 205 and fume extraction connection housing 215. As would be understood by the skilled artisan, each of the welding wire, shielding gas, process gas, control cables, cooling gas, and other connections known to the skilled artisan, may be provided with a separate conduit within flexible portion 210, examples of which are illustrated in FIG. 8B, as discussed below.

Flexible portion 210 may be constructed from a flexible yet strong material. According to specific example embodiments, flexible portion 210 may be constructed from an abrasion and heat resistant material, such as a polyvinyl chloride (PVC) vacuum hose material. The PVC hose material may be provided with additional protection in the form of a leather outer jacket. Other materials may be used in place of the PVC vacuum hose and/or the leather outer jacket, as would be understood by the skilled artisan. For example, other heat resistant thermoplastic materials may be used, such as polyamide. Glass fiber materials may also be used according to the techniques disclosed herein.

Distal end 210b of flexible portion 210 connects to proximal end 215a of fume extraction connection housing 215. Fume extraction connection housing 215 serves as a connection point for a fume extraction device, such as a fume extraction hood, via a fume extraction hose (illustrated and described with reference to FIGS. 6A and 6B, below). Fume extraction torches are equipped with passageways at the tip of the torch head that extract fumes through the torch head, which then travel through the torch connection hose 240 attached to the torch head, and eventually travel out to a fume extraction device. Fume extraction connection housing 215 serves as the connection point for the fume extraction device, such as a fume extraction hood, via extraction hose connection portion 214. The fume extraction device may provide a vacuum or low pressure to the torch head in order to draw the fume gasses through the passageways at the tip of the torch head, through the torch connection hose 240, through fume extraction connection housing 215, and out to the fume extraction device via extraction hose connection portion 214.

To serve as this connection point to the fume extraction device, fume extraction connection housing 215 includes three orifices 212a-c and an interior 213. Orifice 212a is formed in extraction hose connection portion 214 and serves as a passageway from the interior 213 to the fume extraction device. Orifice 212a allows extraction gasses to flow to the fume extraction device via vacuum or low pressure applied to the interior 213 from the fume extraction device. Orifice 212b serves as a passage from the interior 213 to the torch head via torch connection hose 240, and allows the connections provided by the cable support housing 205 to connect with the torch head via torch connection hose 240. Orifice 212b also serves as a passage via which the vacuum or low pressure generated by the fume extraction device may be applied to the torch head. Orifice 212c provides a passageway through flexible portion 210 to the interior 213 for the connections provided by cable support housing 205.

Proximal end 215a of fume extraction connection housing 215 may be embodied as a swivel or rotary joint to enable flexible portion 210 to rotate up to 360° relative to fume extraction connection housing 215. According to other example embodiments, distal end 210b of flexible portion 210 may be embodied as a swivel or rotary joint to enable flexible portion 210 to rotate up to 360° relative to fume extraction connection housing 215. While the example embodiment of FIG. 2 illustrates a rotatable connection between cable support housing 205 and flexible portion 210 and also between flexible portion 210 and fume extraction connection housing 215, one or both of the rotatable connections may be omitted without deviating from the concepts of the present disclosure.

Arranged within proximal end 215a of fume extraction connection housing 215 may be a seal 300 configured to prevent extraction fumes from entering flexible portion 210 and cable support housing 205. For example, seal 300 may be arranged within orifice 212c. Seal 300 may prevent or decrease contamination of the electrical connections between cable support housing 205 and the wire feeder or welding/cutting power source. In other words, the seal 300 may prevent or lessen the amount of the extraction fumes that reach cable support housing 205, and therefore, the amount of contamination of electrical connection 207 caused by the extraction fumes may be lessened or eliminated. Seal 300 may also lessen or minimize the amount of fresh air drawn into the extraction circuit from, for example, the cable support housing 205, thereby increasing the extraction capacity of the torch head.

Figure 3:
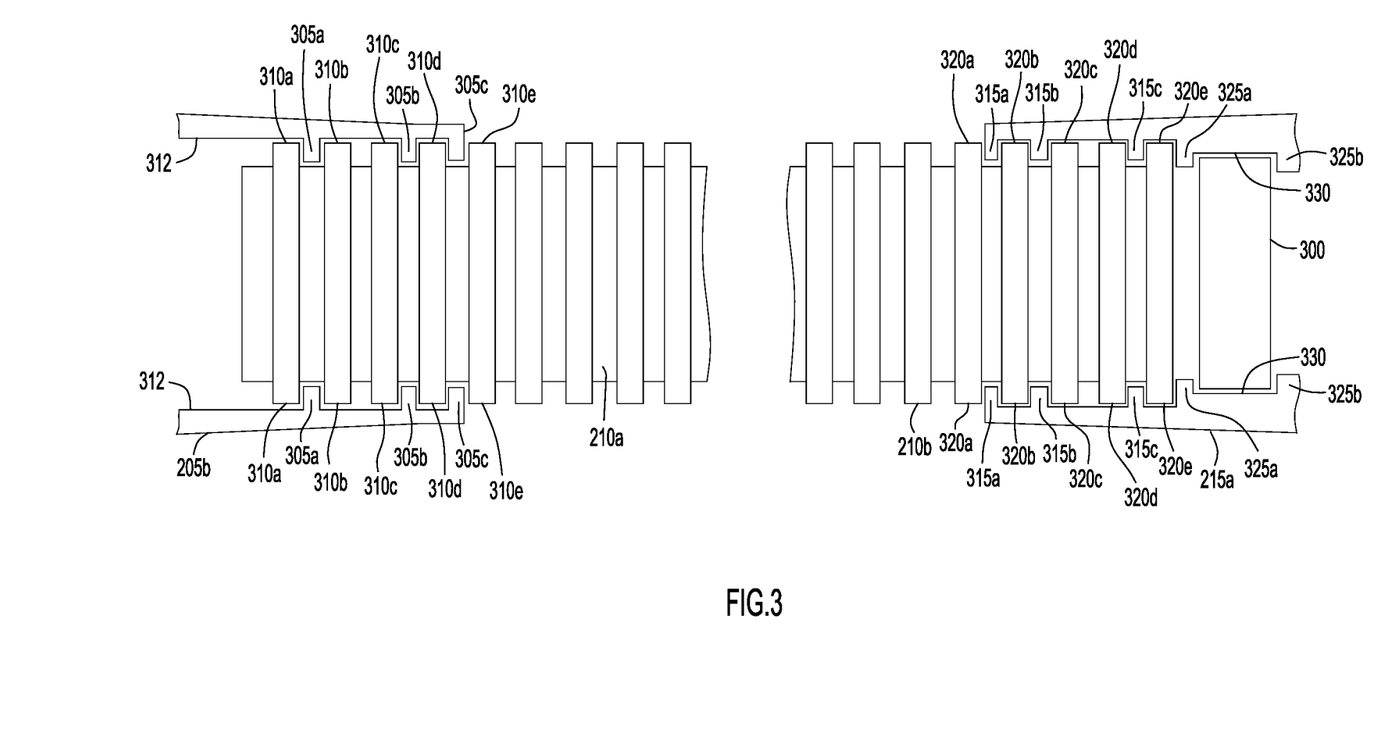
FIG. 3 is a first detailed view of an arrangement of a flexible connection and a seal arranged with a cutaway view of a fume extraction connection housing and a cutaway view of a machine-side connection housing, according to example embodiments.
Figure 4:
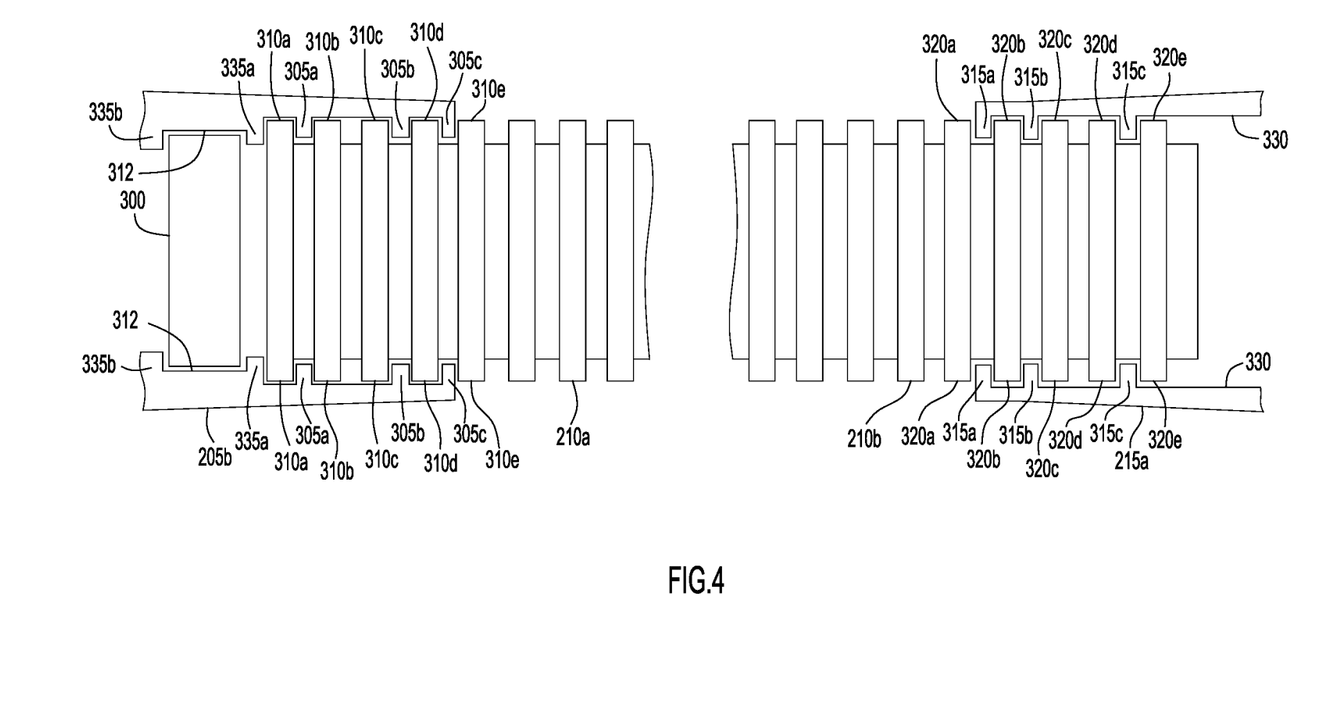
FIG. 4 is a second detailed view of an arrangement of a flexible connection and a seal with a cutaway view of a fume extraction connection housing and a cutaway view of a machine-side connection housing, according to example embodiments.

Seal 300 is illustrated as being arranged within proximal end 215a of fume extraction connection housing 215. According to other example embodiments, seal 300 may be arranged within distal end 205b of cable support housing 205, as illustrated in detail below with reference to FIG. 4. According to still other example embodiments, a plurality of seals 300 may be used, with a first seal arranged within proximal end 215a of fume extraction connection housing 215 (as illustrated in FIG. 3) and a second seal arranged within distal end 205b of cable support housing 205 (as illustrated in FIG. 4).

Fume extraction connection housing 215 includes a distal end 215b, and connected thereto is torch connection hose 240. Cables, conduits and hoses (such as those illustrated in FIG. 8B) pass from the interior 213 of fume extraction connection housing 215 through torch connection hose 240 to connect with the torch head (not illustrated). The torch head may be embodied as a metal inert gas (MIG) welding torch head, a metal active gas (MAG) welding torch head, a tungsten inert gas (TIG) welding torch head, or a cutting torch head, such as a plasma torch head. Torch connection hose 240 may be configured to be large enough to accommodate the hoses, cables and conduits for the connections made in cable support housing 205 as well as providing proper flow for the fume extraction gases extracted through the extraction device connected through fume extraction connection housing 215. Torch connection hose 240 may be formed with a layered construction in which a PVC vacuum hose (in which the hoses, cables and conduits are arranged) is contained within an outer metal plated fume extract or "smoke hose" through which the fume extraction gases pass. Both of these hoses may also be arranged within an outer jacket, such as a leather outer jacket.

Finally, distal end 215b of fume extraction connection housing 215 may be configured to accommodate different adaptors that enable fume extraction connection housing 215 to accommodate different sized torch connection hoses 240. This may allow fume extraction connection housing 215 to accommodate different fume extraction devices with different fume extraction capacities. Accordingly, the adaptors may be arranged within or over orifice 212b to accommodate the different sized torch connection hoses 240. According to specific example embodiments, orifice 212b may be threaded to accommodate corresponding threads in the adaptors. However, other ways of connecting the adaptors to fume extraction connection housing 215 may be used without deviating from the concepts of the present disclosure.

Similarly, orifice 212a of extraction hose connection portion 214 of fume extraction connection housing 215 may be configured to accommodate different adaptors that enable extraction hose connection portion 214 to accommodate different sized fume extraction hoses. Allowing extraction hose connection portion 214 to accommodate different sized fume extraction hoses may allow fume extraction connection housing 215 to accommodate different fume extraction devices with different fume extraction capacities. Accordingly, the adaptors may be arranged over or within orifice 212a to accommodate the different sized fume extraction hoses. According to specific example embodiments, orifice 212a may be threaded to accommodate corresponding threads in the adaptors. However, other ways of connecting the adaptors to fume extraction connection housing 215 may be used without deviating from the concepts of the present disclosure. For example, extraction hose connection portion 214 may be configured to provide a snap-fit to a plurality of different sized fume extraction hoses, as illustrated in FIG. 6.

With reference now made to FIG. 3, illustrated therein is a cutaway view of distal end 205b of cable support housing 205, a view of proximal end 210a of flexible portion 210, a view of distal end 210b of flexible portion 210 and a cutaway view of proximal end 215a of fume extraction connection housing 215. The detailed view of FIG. 3 illustrates the rotatable connection between proximal end 210a of flexible portion 210 and distal end 205b of cable support housing 205, the rotatable connection between distal end 210b of flexible portion 210 and proximal end 215a of fume extraction connection housing 215, and the arrangement and connection of seal 300 within proximal end 215a of fume extraction connection housing 215.

Included within distal end 205b of cable support housing 205 are retention portions 305a-c. Retention portions 305a-c are configured to engage proximal end 210a of flexible portion 210 between extrusions 310a-e. Specifically, retention portions 305a-c extend radially inward from the inner surface 312 of distal end 205b of cable support housing 205. Retention portions 310a-e retain proximal end 210a of flexible portion 210 in distal end 205b of cable support housing 205 by preventing flexible portion 210 from moving axially relative to cable support housing 205. Retention portions 305a-c also provide a rotatable connection between flexible portion 210 and cable support housing 205 by allowing flexible portion 210 to rotate within distal end 205b of cable support housing 205.

Similarly, included within proximal end 215a of fume extraction connection housing 215 are retention portions 315a-c. Retention portions 315a-c are configured to engage distal end 210b of flexible portion 210 between extrusions 320a-e. Specifically, retention portions 315a-c extend radially inward from the inner surface 330 of proximal end 215a of fume extraction connection housing 215. Retention portions 315a-c retain distal end 210b of flexible portion 210 in proximal end 215a of fume extraction connection housing 215 by preventing flexible portion 210 from moving axially relative to fume extraction connection housing 215. Retention portions 315a-c also provide a rotatable connection between flexible portion 210 and fume extraction connection housing 215 by allowing flexible portion 210 to rotate within proximal end 215a of fume extraction connection housing 215.

Also illustrated in FIG. 3 is seal 300 arranged within proximal end 215a of fume extraction connection housing 215. Seal 300 is retained within proximal end 215a of fume extraction connection housing 215 via retention portions 325a and 325b, which extend radially inward from inner surface 330 of proximal end 215a of fume extraction connection housing 215. As illustrated in FIG. 3, retention portions 325a and 325b prevent seal 300 from moving axially within proximal end 215a of fume extraction connection housing 215. Seal 300 may be press fit to inner surface 330 of proximal end 215a of fume extraction connection housing 215 to prevent the rotation of seal 300 within proximal end 215a of fume extraction connection housing 215.

With reference now made to FIG. 4, illustrated therein is a second cutaway view of distal end 205b of cable support housing 205, proximal end 210a of flexible portion 210, distal end 210b of flexible portion 210 and a cutaway view of proximal end 215a of fume extraction connection housing 215. FIG. 4 differs from FIG. 3 in that seal 300 is arranged in distal end 205b of cable support housing 205 as opposed to proximal end 215a of fume extraction connection housing 215 (as illustrated in FIG. 3). Accordingly, seal 300 is retained within distal end 205b of cable support housing 205 via retention portions 335a and 335b, which extend radially inward from inner surface 312 of distal end 205b of cable support housing 205. As illustrated in FIG. 4, retention portions 335a and 335b prevent seal 300 from moving axially within distal end 205b of cable support housing 205. Seal 300 may be press fit to inner surface 312 of distal end 205b of cable support housing 205 to prevent the rotation of seal 300 within distal end 205b of cable support housing 205.

Figure 5A:
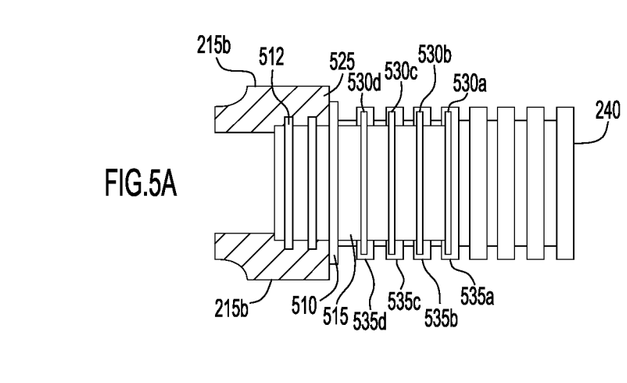
FIGS. 5A-5D illustrate connections between fume extraction connection housings and welding torch connection hoses, according to example embodiments.
Figure 5B:
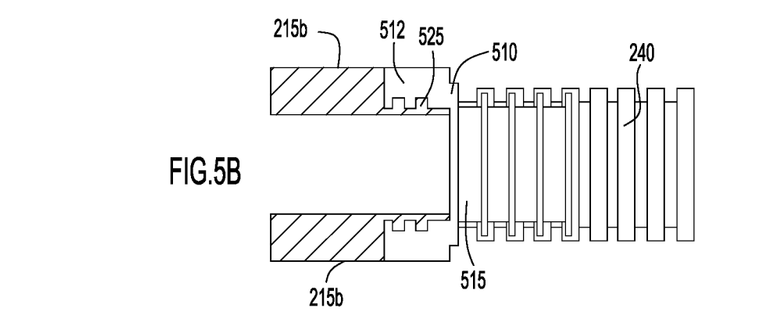

With reference now made to FIG. 5A, depicted therein is a cutaway view of distal end 215b of fume extraction connection housing 215, illustrating the connection of torch connection hose 240 to fume extraction connection housing 215. Included in FIG. 5A is hose connection portion 510 which is configured to connect torch connection hose 240 to fume extraction connection housing 215. Hose connection portion 510 includes a threaded portion 512 and a hose retention portion 515. Threaded portion 512 is configured to mate with corresponding threaded portion 525 of distal end 215b of fume extraction connection housing 215. Specifically, threaded portion 512 of hose connection portion 510 is configured as a male threaded connection with a pitch that matches that of threaded portion 525 of distal end 215b of fume extraction connection housing 215, which is configured as a female threaded connection. According to other example embodiments, such as that illustrated in FIG. 5B, threaded portion 512 of hose connection portion 510 may be configured as a female threaded connection with a pitch that matches that of male threaded portion 525 of distal end 215b of fume extraction connection housing 215.

Hose connection portion 510 of FIG. 5A is configured such that protrusions 530a-d extend out radially from hose retention portion 515 into extrusions 535a-d of torch connection hose 240, thereby preventing torch connection hose 240 from moving axially relative to hose retention portion 515.

According to other example embodiments, hose connection portion 510 may be configured to connect to distal end 215b of fume extraction connection housing 215 via other types of connections, such as snap-fit connections or press fit connections.

Figure 5C:
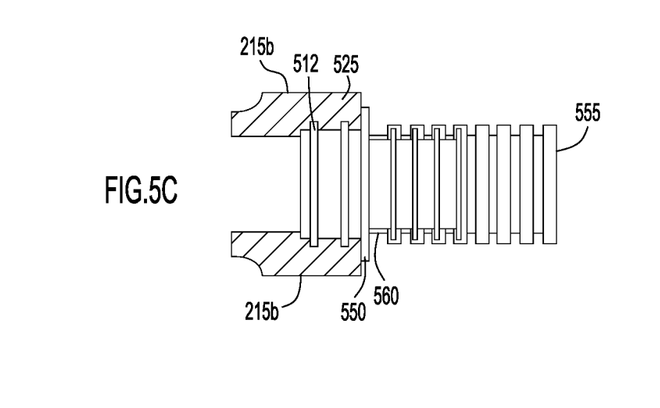
Figure 5D:
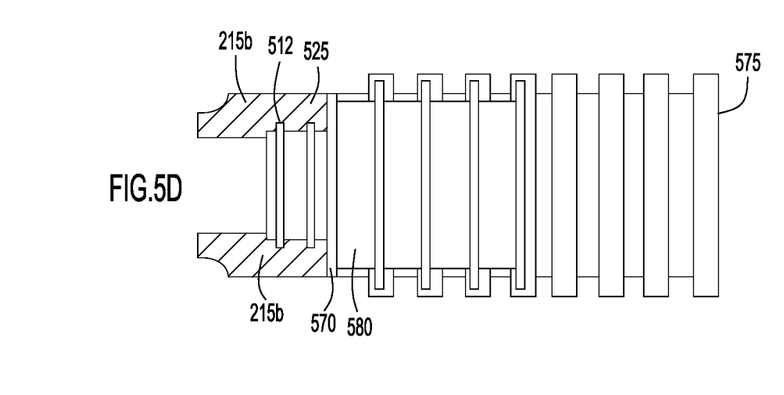

As illustrated in FIGS. 5C and 5D, different hose connection portions 550 (as illustrated in FIG. 5C) and 570 (as illustrated in FIG. 5D) may be used to connect a smaller torch connection hose 555 (as illustrated in FIG. 5C) or a larger torch connection hose 575 (as illustrated in FIG. 5D) using different sized hose retention portions 560 and 580 (respectively) with the same threaded portion 512.

Figure 6A:
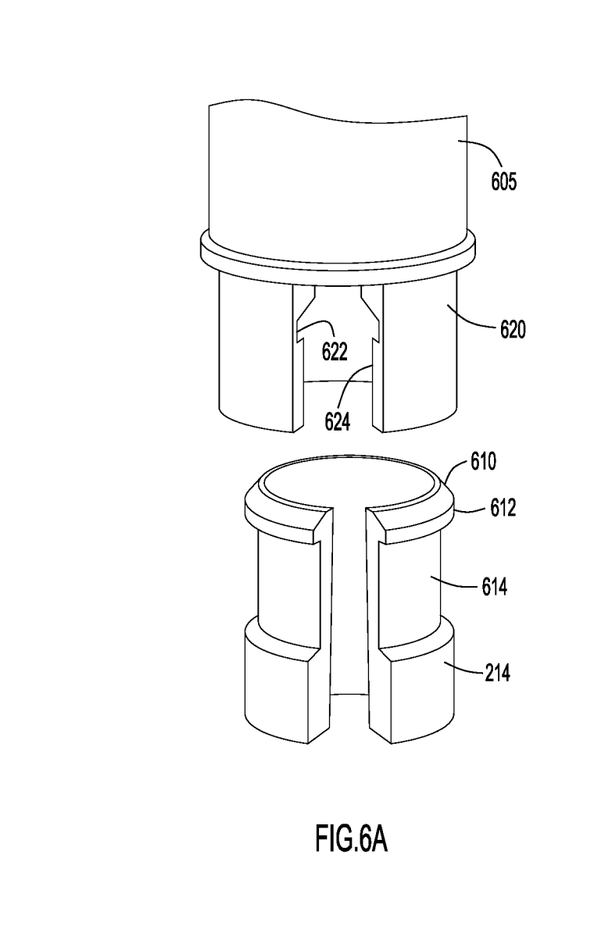
FIGS. 6A and 6B illustrate connections between fume extraction connection housings and fume extraction hoses, according to example embodiments.

With reference now made to FIG. 6A, depicted therein is a cut-away view of extraction hose connection portion 214 of fume extraction connection housing 215 and a fume extraction hose 605. Extraction hose connection portion 214 is configured with a male snap-fit connection portion 610, and fume extraction hose 605 is configured with a female snap-fit connection portion 620. As illustrated in FIG. 6A, male engagement portion 612 is configured to engage with recess 622 in the inner surface 624 of female snap-fit connection portion 620. Inner surface 624 of female snap-fit connection portion 620 is configured to engage with recessed surface 614 of male snap-fit connection portion 610. With male engagement portion 612 engaged with recess 622 and inner surface 624 engaged with recessed surface 614, fume extraction hose 605 is prevented from moving axially relative to extraction hose connection portion 214, but due to the cylindrical structure of extraction hose connection portion 214 and fume extraction hose 605, fume extraction hose 605 is free to rotate relative to extraction hose connection portion 214. According to other example embodiments, extraction hose connection portion 214 may be configured with a female snap-fit connection portion and fume extraction hose 605 may be configured with a male snap-fit connection portion. According to other example embodiments, extraction hose connection portion 214 may be configured to engage with fume extraction hose 605 via other types of connections, such as threaded connections or press fit connections.

Figure 6B:
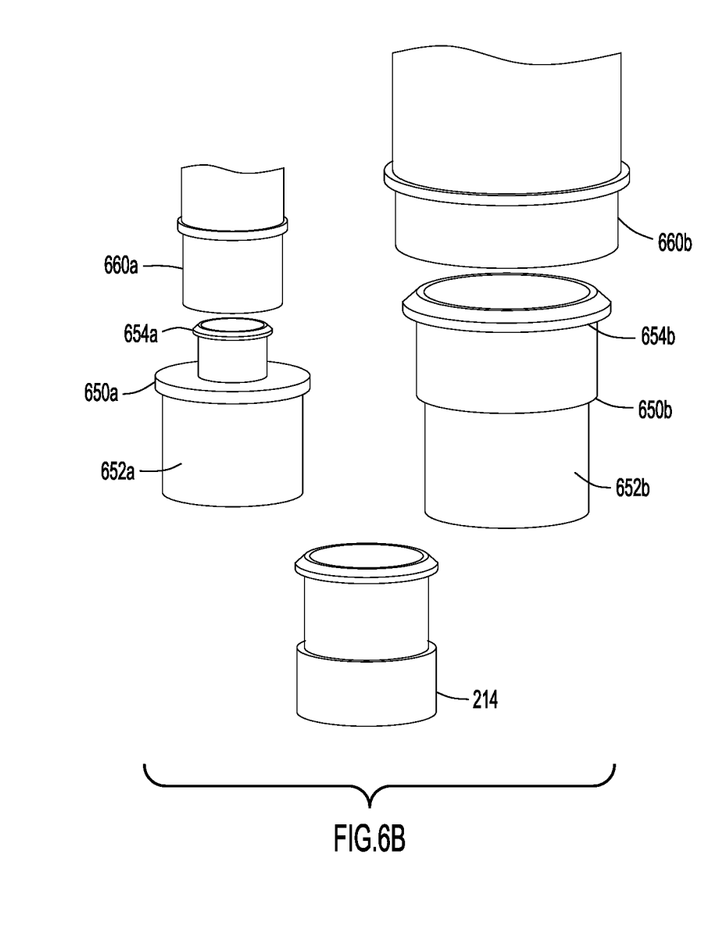

With reference now made to FIG. 6B, depicted therein is extraction hose connection portion 214 and adapters 650a and 650b that may be used to connect a smaller fume extraction hose 660a or a larger fume extraction hose 660b to extraction hose connection portion 214. Specifically, each of adapters 650a and 650b includes a torch-side connection portion 652a or 652b that is sized to connect to extraction hose connection portion 214. For example, each of torch-side connection portions 652a and 652b may be configured to provide a snap-fit to extraction hose connection portion 214 that has a similar structure to that of snap-fit connection portion 620 of FIG. 6A. Each of adapters 650a and 650b also includes a fume extraction device-side connection portion 654a or 654b that is configured to engage with fume extraction hose 660a or 660b, respectively. According to other example embodiments, adapters 650a and 650b may be configured to engage with extraction hose connection portion 214 and/or fume extraction hose 605 via other types of connections, such as threaded connections or press fit connections.

Figure 7A:
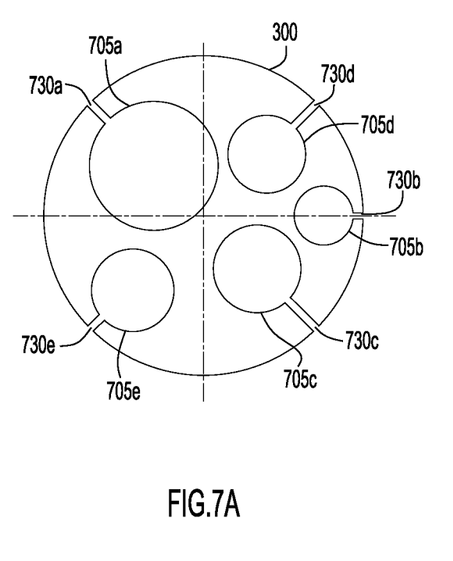
FIGS. 7A and 7B illustrate seals used with fume extraction connection housings and machine-side connection housings, according to example embodiments.
Figure 7B:
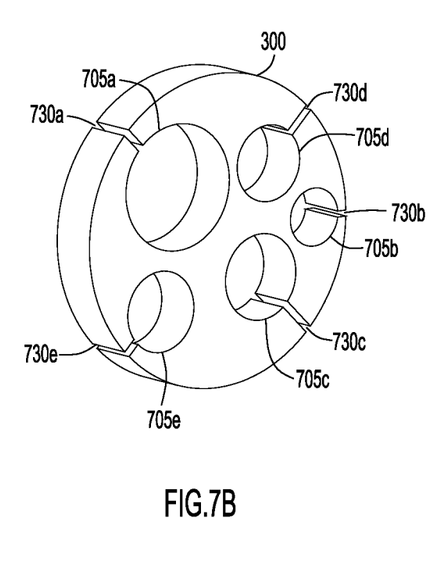

Reference is now made to FIGS. 7A and 7B. Depicted in FIGS. 7A and 7B is an example seal 300 in front and perspective views, respectively. Seal 300 includes orifices 705a-e. These orifices provide passages through seal 300 for a power/water conduit (orifice 705a), a control cable (orifice 705b), a welding wire conduit (orifice 705c), a shielding gas hose (orifice 705d) and a water-in hose (orifice 705e). Also illustrated in FIGS. 7A and 7B are slits 730a-e. Slits 730a-e may be beneficial during the assembly of the fume extraction connection housing 215 as slits 730a-e press into place the conduits and hoses that pass through orifices 705a-e as the seal is press fit into either of fume extraction connection housing 215 (as illustrated in FIG. 3) or cable support housing 205 (as illustrated in FIG. 4).

Figure 8A:
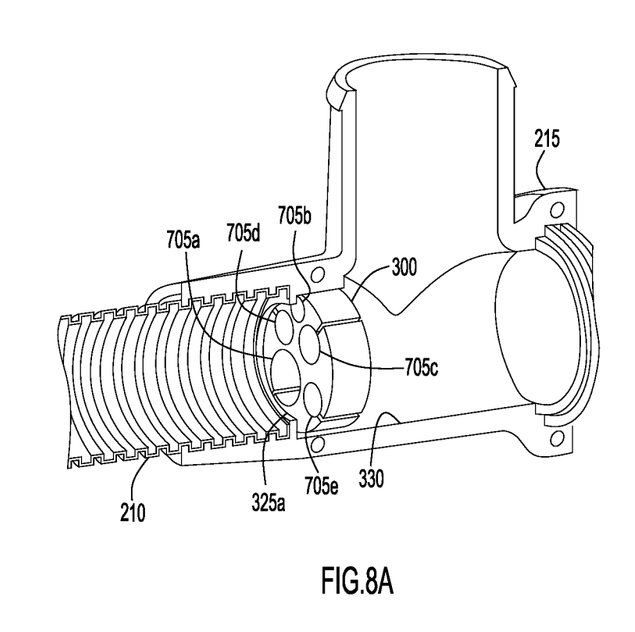
FIGS. 8A and 8B illustrate the arrangement of a seal within a fume extraction connection housing and the passage of conduits through the seal, according to example embodiments.
Figure 8B:
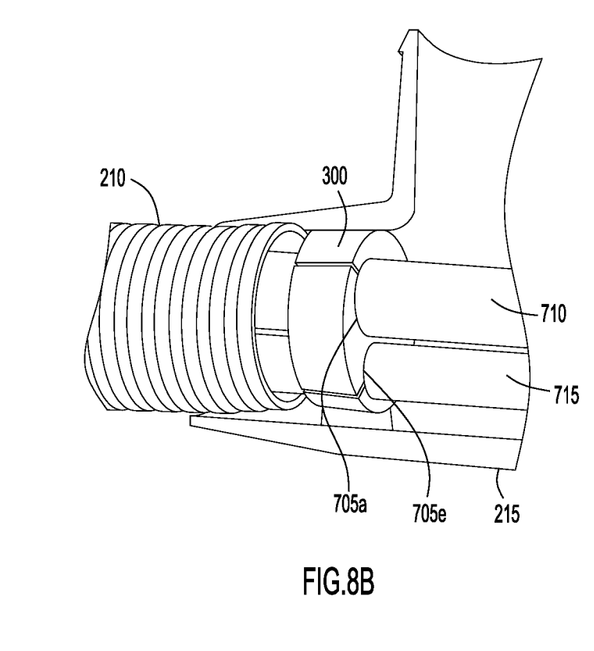

With reference now made to FIGS. 8A and 8B, depicted therein are cut-away views of fume extraction connection housing 215 showing the arrangement of seal 300 within fume extraction connection housing 215 (FIG. 8A) and conduits passing through seal 300 (FIG. 8B). As illustrated in these figures, cables and hoses (e.g., the power/water cable 710 and water-in hose 715 as illustrated in FIG. 8B) may pass through seal 300, but seal 300 otherwise prevents passage of gas and debris from fume extraction connection housing 215 into flexible portion 210. Seal 300 may be formed with more or fewer orifices without deviating from the concepts of the present disclosure.

As further depicted in FIG. 8A, seal 300 is press-fit against retention portions 325a and inner surface 330 of fume extraction connection housing 215. According to other example embodiments, seal 300 may be arranged within fume extraction connection housing 215 in other ways. For example, seal 300 may be arranged within two retention portions 325a and 325b formed in inner surface 330 of fume extraction connection housing 215, as illustrated in FIG. 3. According to other example embodiments, seal 300 may be integrally formed with fume extraction connection housing 215. According to still other example embodiments, seal 300 may be integrally formed with flexible portion 210.

As illustrated in FIG. 8B, seal 300 is configured with orifices 705a-e such that cables, hoses and/or conduits may pass there through. As shown in FIG. 8B, power/water cable 710 passes through orifice 705a and water-in hose 715 passes through orifice 705e. According to other example embodiments, seal 300 may be formed with connections such that a hose, cable or conduit terminates on one side of seal 300, with a connection in seal 300 bridging through seal 300 to connect with another hose, cable or conduit to continue the connection through flexible portion 210 and into the interior 213 of cable support housing 205.

According to specific example embodiments, seal 300 may be constructed from a material such as ethylene propylene diene monomer (EPDM) rubber or PVC. When integrally formed with either of the flexible portion 210 or fume extraction connection housing 215, the seal may be constructed from EPDM or PVC. According to other example embodiments, seal 300 may be constructed from other heat resistant soft plastic materials, such as nitrile rubber.

Figure 9:
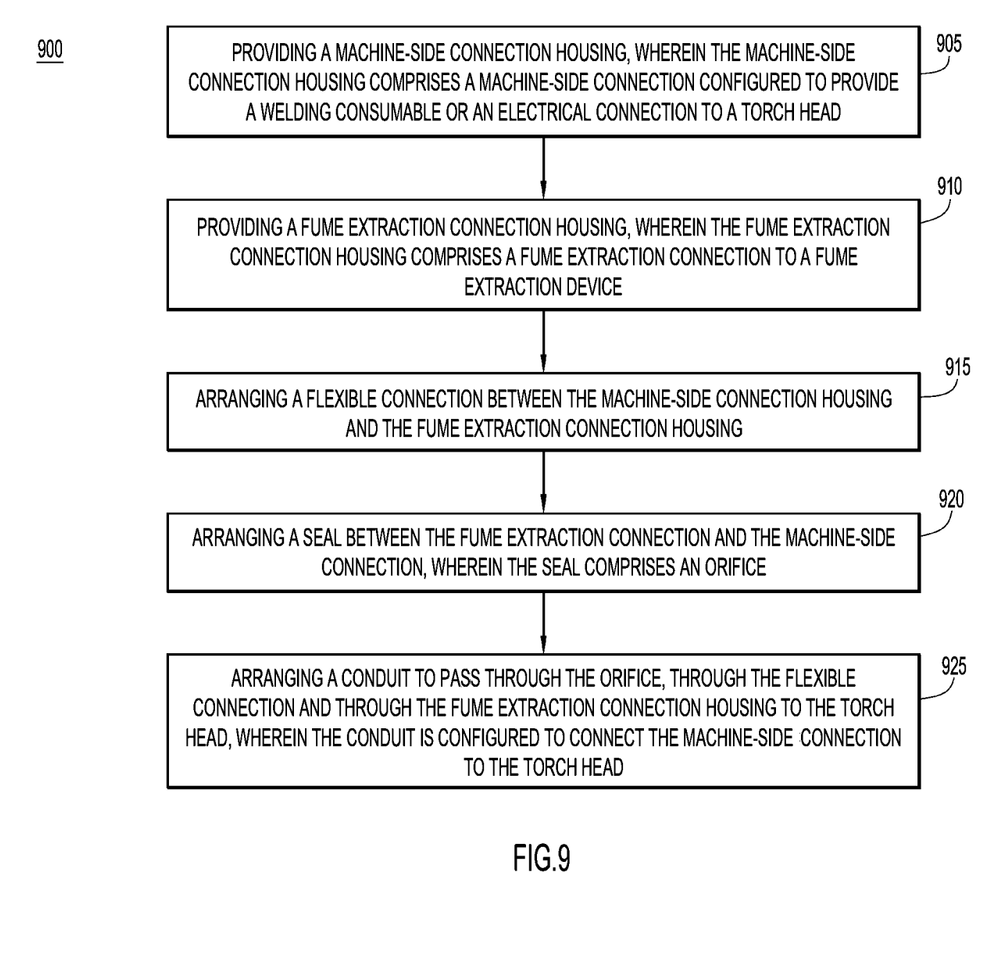
FIG. 9 illustrates a process flow according to the techniques of the present disclosure, according to example embodiments.

With reference now made to FIG. 9, depicted therein is a flowchart 900 illustrating a process flow for implementing the techniques of the present disclosure. The process flow of FIG. 9 begins in operation 905 in which a machine-side connection housing is provided. The machine-side connection housing includes a machine-side connection configured to provide a welding consumable or an electrical connection to a torch head. Accordingly, operation 905 may be embodied as providing a cable support housing, such as cable support housing 205 of FIG. 2. Furthermore, the machine-side connection of operation 905 may be embodied as one or more of wire conduit connection 206, electrical or control connection 207, power connection 208 and/or cooling hose connections 220a and 220b, as illustrated in FIG. 2.

In operation 910, a fume extraction connection housing is provided. The fume extraction connection housing includes a fume extraction connection to a fume extraction device. Accordingly, operation 910 may be embodied as a providing a fume extraction connection housing 215, as illustrated in FIG. 2, with the fume extraction connection being embodied as extraction hose connection portion 214.

In operation 915, a flexible connection is arranged between the machine-side connection housing and the fume extraction connection housing. Accordingly, arrangement of the flexible connection of operation 915 may be embodied as the arrangement of flexible portion 210 of FIG. 2.

In operation 920, a seal is arranged between the fume extraction connection and the machine-side connection. The seal includes at least one orifice. Operation 920 may be embodied as the arrangement of seal 300 in fume extraction connection housing 215, as illustrated in FIGS. 2 and 3. Operation 920 may also be embodied in the arrangement of seal 300 in cable support housing 205, as illustrated in FIG. 4. According to other example embodiments, a seal may be arranged in both of cable support housing 205 and fume extraction connection housing 215.

In operation 925, a conduit is arranged to pass through the orifice, through the flexible connection, and through the fume extraction connection housing to the torch head. The conduit may be configured to connect the machine-side connection to the torch head. Accordingly, operation 925 may be embodied as arranging one or more of the conduits or connections described above with reference to FIGS. 2, 8A and/or 8B, above.

Additional operations may be included in the process flow of flowchart 900 without deviating from the techniques of the present disclosure. For example, the process flow of flowchart 900 may include additional operations, such as connecting a fume extraction hose to the fume extraction connection. Note that this disclosure applies equally to welding and cutting torch heads without departing from the scope of the present disclosure, and thus, the process flow of flowchart 900 may also include performing a welding or cutting operation with the torch head. Additional operations may also include extracting fume gases via the torch head, passing the fume gases to the fume extraction connection housing, and passing the fume gases through the fume extraction connection the fume extraction device.

In summary, provided for herein is a fume extraction machine-side connection for connection of the torch cable and the fume extraction hose to the wire feeder or welding/cutting power supply that may eliminate problems in related art machine-side connectors, while also improving the vacuum seal for the fume extraction hose. As shown in the example embodiments discussed above, fume extraction connection housing for the fume extraction hose is separated from the machine-side connection housing, which couples to the wire feeder or welding/cutting power source, by a flexible and rotatable hose. This flexible and rotatable hose enables the fume extraction connection housing, and thus the fume extraction hose, to be rotated and/or pivoted with respect to the machine-side connection housing, which provides flexibility in placement of the wire feeder or welding/cutting power source with respect to that of the fume extraction hose. Furthermore, with the fume extraction connection housing being separated from the machine-side connection housing via the flexible hose, the inflexible portion of the machine-side connection (e.g., the machine-side connection housing) does not protrude as far out from the wire feeder or power source as in related art connectors, which minimizes the chance the connection housing becomes broken. Moreover, by being able to rotate and/or position the fume extraction connection housing, as well as by spacing the fume extraction connection housing from the machine-side connection housing, some or all of the weld or cutting fumes may be unable to reach the machine-side connection housing, eliminating or lessening the possible contamination of the electrical connections that may be contained in the machine-side connection housing.

As also discussed above, the end of the fume extraction connection housing that is connected to the flexible hose may be equipped with a seal that prevents the vacuum applied to the fume extraction connection housing from also being applied to the flexible/rotatable outer hose and the machine-side connection housing. This may minimize the amount of fresh air drawn into the extraction circuit, thereby increasing the extraction capacity of the torch. The fume extraction connection housing may be also equipped with adapters on one end that enables the fume extraction connection housing to accommodate different sized fume extraction hoses.

The above description is intended by way of example only.

What is claimed is:

1. An apparatus comprising:
    a machine-side connection housing comprising a machine-side connection arranged on a first end of the machine-side connection housing and configured to engage with a wire feeder or power source via which a welding consumable or an electrical connection is provided to a torch head;
    a fume extraction connection housing comprising a fume extraction connection to a fume extraction device;
    a flexible connection arranged between a second end of the machine-side connection housing and the fume extraction connection housing;
    a seal comprising a first orifice arranged between the fume extraction connection and the machine-side connection; and
    a conduit, configured to connect the machine-side connection to the torch head, arranged to pass through the first orifice, through the flexible connection and through the fume extraction connection housing to the torch head.

2. The apparatus of claim 1, wherein the seal is arranged in the fume extraction connection housing between the flexible connection and the fume extraction connection.

3. The apparatus of claim 1, wherein the seal is arranged in the machine-side connection housing between the flexible connection and the machine-side connection.

4. The apparatus of claim 1, wherein the flexible connection is rotatably connected to the fume extraction connection housing.

5. The apparatus of claim 1, wherein the flexible connection is rotatably connected to the machine-side connection housing.

6. The apparatus of claim 1, further comprising a torch cable rotatably connected between the torch head and the fume extraction connection housing.

7. The apparatus of claim 1, wherein the fume extraction connection housing comprises:
    an interior;
    a second orifice connecting the interior to the flexible connection;
    a third orifice comprising the fume extraction connection and connecting the interior to the fume extraction device; and
    a fourth orifice connecting the interior to the torch head via a torch cable,
    wherein the seal is arranged to substantially seal the interior of the fume extraction connection housing from the machine-side connection housing.

8. The apparatus of claim 7, further comprising a welding consumable configured to pass through the conduit to the torch head.

9. The apparatus of claim 8, wherein the welding consumable comprises one or more welding wire or shield gas.

10. The apparatus of claim 1, wherein the machine-side connection comprises one or more of an electrical power connection or an electrical control connection.

11. The apparatus of claim 1, where the machine-side connection comprises a wire feeder connection.

12. The apparatus of claim 1, wherein the fume extraction connection housing comprises a T-joint.

\* \* \* \* \*